United States Patent [19]

Luchsinger

[11] Patent Number: 4,768,714
[45] Date of Patent: Sep. 6, 1988

[54] PORTABLE SPRAYER WITH LEAK CONTROL AND AGITATOR

[76] Inventor: Pedro W. Luchsinger, Panamericana 445, Lagos de Moreno, C.P. 47400 Jalisco, Mexico

[21] Appl. No.: 845,631

[22] Filed: Mar. 28, 1986

Related U.S. Application Data

[63] Continuation-in-part of Ser. No. 616,012, May 31, 1984, abandoned.

[51] Int. Cl.⁴ ............................................. B05B 9/04
[52] U.S. Cl. .................................. 239/142; 239/333; 366/136; 417/436
[58] Field of Search ............... 239/154, 142, 143, 127, 239/333, 373, 1; 417/430, 437, 439; 366/136, 137, 159; 406/92; 222/383, 401, 384, 385

[56] References Cited

U.S. PATENT DOCUMENTS

| Re. 27,382 | 5/1972 | Schlosser | 417/439 |
|---|---|---|---|
| 536,092 | 3/1895 | Myers | 239/143 |
| 597,576 | 1/1898 | Gaskins . | |
| 669,819 | 3/1901 | Brooks . | |
| 924,501 | 6/1909 | Sala . | |
| 1,047,791 | 12/1912 | Gregg | 239/127 |
| 1,140,453 | 5/1915 | Frank . | |
| 1,428,928 | 9/1922 | Whaley . | |
| 1,783,882 | 12/1930 | Kohn . | |
| 1,787,751 | 1/1931 | Mathewson . | |
| 2,070,421 | 2/1937 | Chisholm et al. | 92/99 |
| 2,162,057 | 6/1939 | Brandt et al. | 299/97 |
| 2,192,256 | 3/1940 | Brandt | 299/97 |
| 2,284,316 | 5/1942 | Glass | 158/79 |
| 2,569,903 | 10/1951 | Santarelli | 222/263 |
| 2,753,080 | 7/1956 | Bartlett | 222/82 |
| 2,853,015 | 9/1958 | Pleuger | 417/439 |
| 3,094,281 | 6/1963 | Myers | 237/63 |
| 3,399,836 | 9/1968 | Pechstein | 239/333 |
| 3,887,305 | 6/1975 | Ito | 417/439 |
| 4,456,176 | 6/1984 | Agius | 239/142 |

FOREIGN PATENT DOCUMENTS 176781  5/1905  Fed. Rep. of Germany .

Primary Examiner—Andres Kashnikow
Assistant Examiner—Kevin Patrick Weldon
Attorney, Agent, or Firm—Gausewitz, Carr & Rothenberg

[57] ABSTRACT

A pressure vessel for a backpack agricultural sprayer is mounted within a container of the sprayer and connected to the sprayer pump so that liquid from the container is forced under pressure into the pressure vessel for a spraying discharge therefrom. Leakage of liquid past the piston of the sprayer pump is contained by a leak proof diaphragm in a diaphragm chamber which is connected by a conduit to the interior of the sprayer container. The diaphragm is connected to the piston to be operated therewith thus providing two separate but simultaneously acting pumps. The first pump is the piston pump for pressurizing the liquid for spraying discharge. The second pump is the diaphragm which forces liquid back and forth between the container and the diaphragm chamber in a high velocity stream which agitates the contents as the stream is projected into the container interior.

16 Claims, 4 Drawing Sheets

4,768,714

PORTABLE SPRAYER WITH LEAK CONTROL AND AGITATOR

This application is a continuation-in-part of my prior application Ser. No. 616,012 for Sprayer and Diaphragm Pump Therefor filed May 31, 1984, now abandoned the disclosure of which is incorporated by reference as though fully set forth herein.

BACKGROUND OF THE INVENTION

The present invention relates to agricultural sprayers of pressurized liquids and more particularly concerns such a sprayer in which liquid is agitated and in which piston leakage is contained.

Pressurized discharge of various types of liquid insecticides, fertilizers, herbicides and other agricultural-type treatment liquid has been accomplished by directly pressurizing a pressure vessel that is mounted within a portable liquid container, with a pump also connected to the container and pressure vessel. Liquid is drawn from the container, caused to flow under pressure into the pressure vessel and sprayed therefrom under control of a spraying valve.

Such sprayers need but do not provide agitation of container contents. Efficient spraying or agricultural insecticides, herbicides and the like requires control of the amount of insecticide dispensed. Manufacturers of spraying chemicals recommend preferred use rates for efficient application of the chemicals. These rates specify the amount of chemical to be used per acre. However, the recommended rates can be met only if the spraying equipment is able to control the solution strength, in addition to controlling pressure and output flow rate. For some materials, solution strength depends on the amount of nonsoluble but wettable particles maintained in suspension within the solution. In such suspensions, agitation is required to minimize precipitation of solid particles so as to maintain solution strength.

In those sprayers employing piston pumps, the life of the sprayer is often related directly to the life of the pump piston, because leakage of the liquid past a worn pump piston, must be avoided. Liquids sprayed are often toxic and leakage from the sprayer may cause severe damage to the person of the operator or other contaminatio of operator or equipment. To increase the sprayer life and minimize the leakage problem, it has been suggested, as described in my prior application identified above, Ser. No. 616,012, to replace the piston with a diaphragm pump which is not subject to the wear of the piston and which can be more readily and completely sealed for longer pump life. However, the diaphragm pump, although possessing a number of advantages, cannot provide as high an output pressure as a piston pump. Therefore, a piston pump is preferable to a diaphragm pump in many applications.

Neither practical agitation of suspensions of wettable powders nor high pressure leak proof sprayers have heretofor been available in portable agricultural sprayers.

Accordingly, it is an object of the present invention to eliminate or minimize the above-mentioned problems in the spraying of agricultural liquids.

SUMMARY OF THE INVENTION

In carrying out principles of the present invention in accordance with a preferred embodiment thereof, an agricultural sprayer comprising a liquid container in which is mounted a pressure vessel, and having a piston pump for pressurizing the vessel with liquid drawn from the container, is provided with an arrangement that both contains pump leakage and agitates liquid within the container. According to a feature of the invention, an agitator chamber is connected by a conduit to the interior of the container and the chamber volume is repetitively and cyclically varied to alternately draw liquid into the chamber from the interior of the container and force a high velocity stream of agitating liquid from the chamber back into the container. According to another feature of the invention, a piston pump is provided for pressurizing the pressure vessel of the sprayer and a diaphragm pump, having a diaphragm connected to reciprocate together with the piston of the piston pump, is provided to both contain piston leakage and pump liquid back and forth between the diaphragm chamber and the container, thereby providing a pulsating, high velocity liquid jet that is projected into the container for agitating the contents thereof.

DESCRIPTION OF A PREFERRED EMBODIMENT

A novel pumping assembly is provided incorporating a pair of pumps of which one is a piston pump capable of providing the high pressure for the interior of the pressure vessel. The other is a diaphragm pump which is arranged to perform three functions. First, it provides a repetitive or pulsating high velocity jet that is projected into the interior of the container for agitation of the contents thereof. Second, the diaphragm pump is positioned to receive, contain and confine liquid that may leak past the piston seals, liquid that would otherwise leak from the pumping apparatus to contaminate the clothing of the operator. Third, the diaphragm itself acts as a return spring for both pumps, providing a resilient over center snap action that assists both pressure and section strokes of both piston and diaphragm. The arrangement is such that the entire interior of the pumping apparatus including the pumping chamber, the agitating chamber and of course the interior of the pessure vessel and container itself are all readily flushed and cleaned with clear flushing water that can flow into all areas of the interior of the apparatus and which can be readily flushed therefrom.

Figure 1:
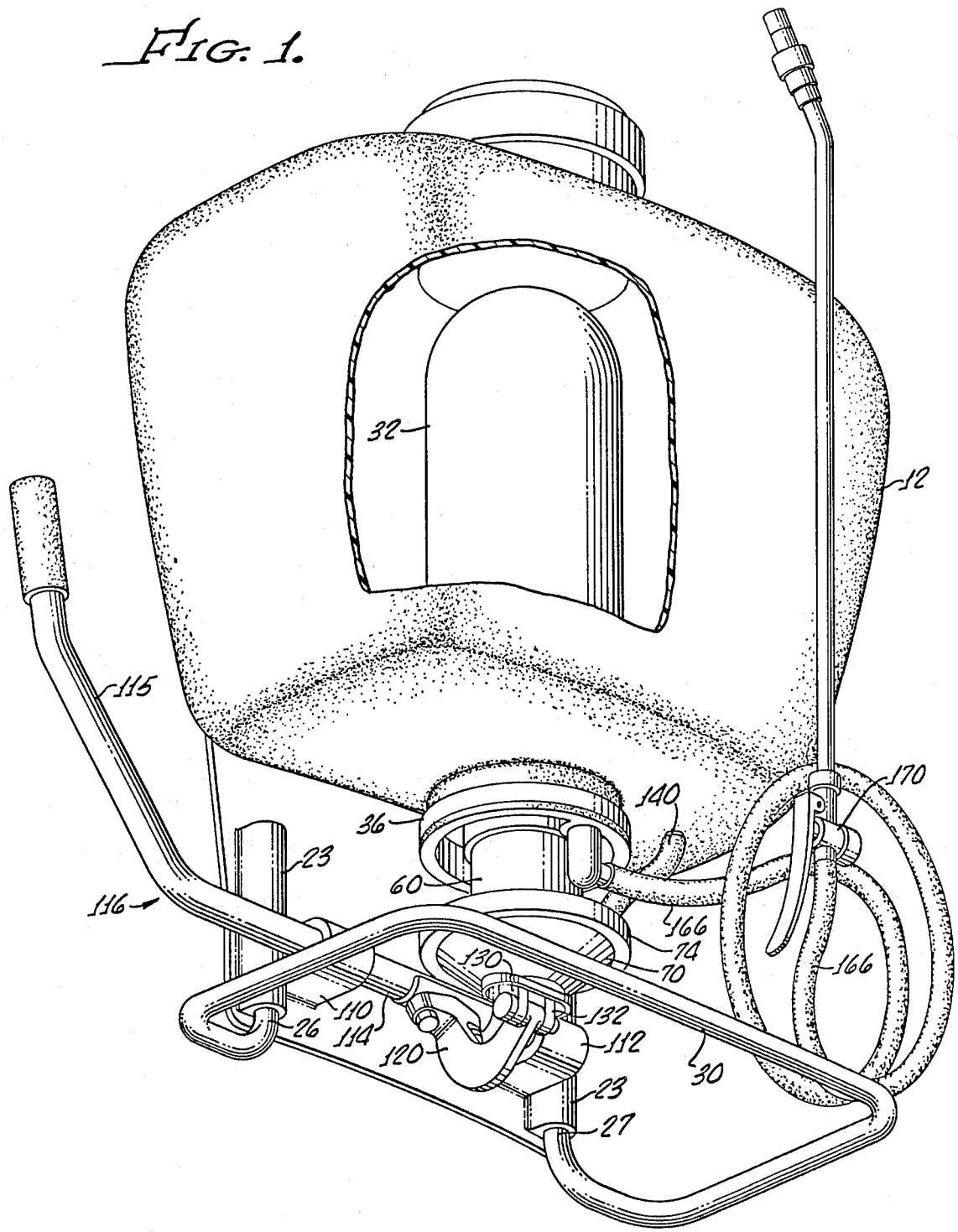
FIG. 1 is a pictorial illustration, with parts broken away, showing a backpack sprayer embodying principles of the present invention.
Figure 2:
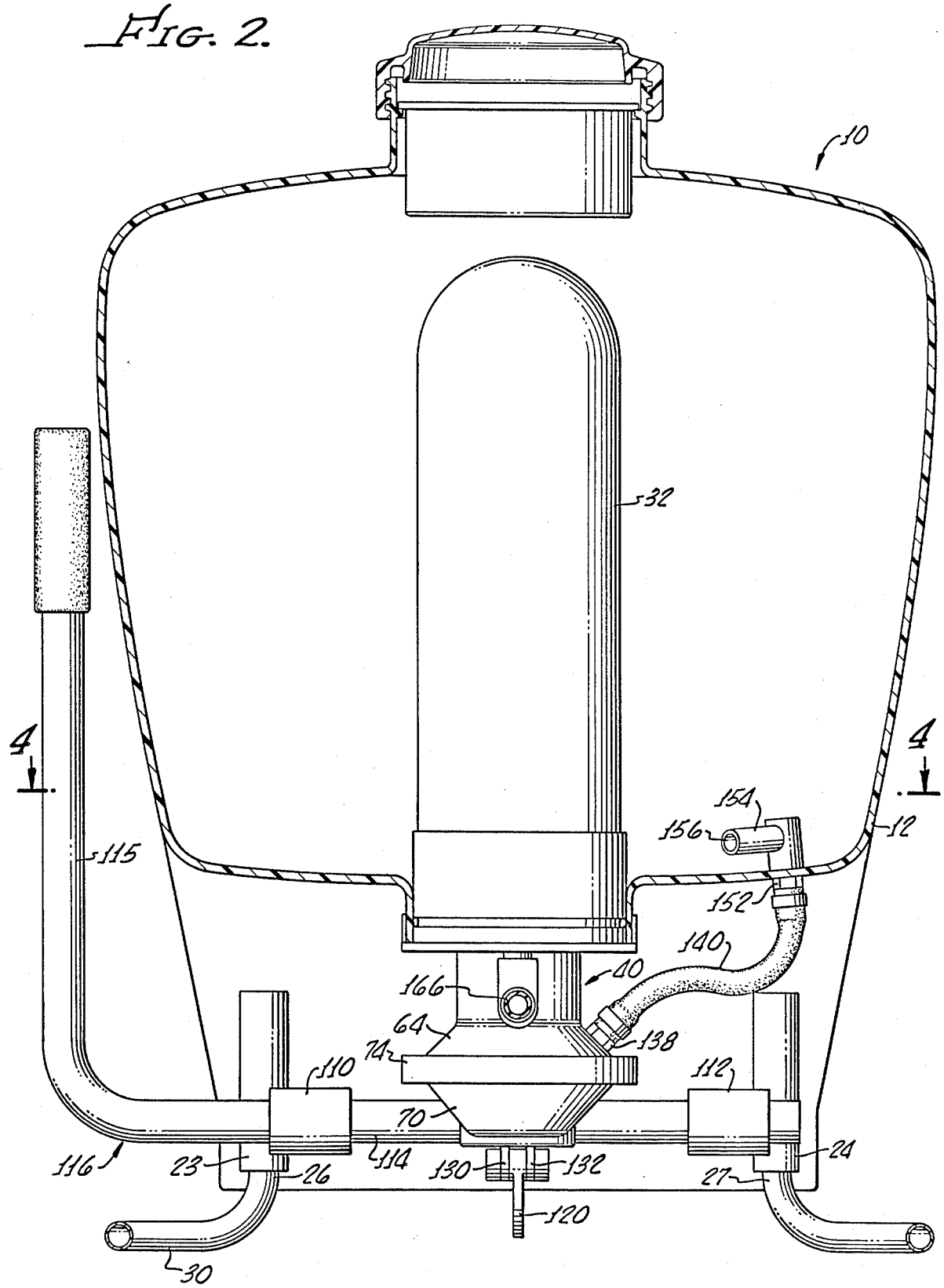
FIG. 2 is a sectional elevation view of the sprayer of FIG. 1.

As shown in FIGS. 1 and 2, a reservoir or container 10 is formed of a plastic body 12 having a fill neck 14 providing an opening that is closed and sealed by a detachable cap 16. A back supporting panel 18, that is an integral portion of the back wall of the container, extends downwardly for a distance below the bottom 22 of the container and includes enlarged bosses 23,24 for fixed reception of verticle leg portions 26,27 of a generally rectangular supporting frame 30, to thereby fixedly and rigidly secure the supporting frame to the container.

A vertically, elongated pressure vessel 32 extends within the container 10 from an upper portion of the container substantially vertically downwardly to be securely mounted in a bottom opening formed by a depending skirt portion 34 of the container. A container circumscribing clamp 36 fixedly but detachably secures the pressure vessel 32 to and within the container skirt opening. The lower end of the pressure vessel is formed with an internally threaded fitting 38 which threadedly receives a valve and dual pump assembly 40. The valve and pump assembly includes a pump housing 42 having an upper threaded section 44 that is thrededly received in and sealed to a threaded opening formed in a bottom portion 46 of the pressure vessel 32. Mounted in the section 44 is a valve assembly 48 having valve disks 50 and 52 connected to opposite ends of a spindle 54 to provide one-way flow respectively through an output pressure conduit 56 and an input conduit 58 which provide communication between the interior of the pump housing and the pressure vessel (for the output pressure conduit) and the container (for the input conduit).

A high pressure piston pump is formed in part by the pump and valve housing 42 which includes an intermediate piston receiving cylindrical housing section 60 in which is slidably mounted and received a hollow, cylindrical piston 62 formed of a piston holder 63 and a piston cup 65. Housing section 60 merges with an integral downwardly and outwardly flaring diaphragm housing section 64 having a circular peripheral edge flange 66 that mates with a circular peripheral edge flange 68 of a frustoconical cover section 70. Housing section 64 and cover section 70 are fixedly interconnected by a continuous circular peripheral clamping member 74 having a channel shaped cross section.

Figure 3:
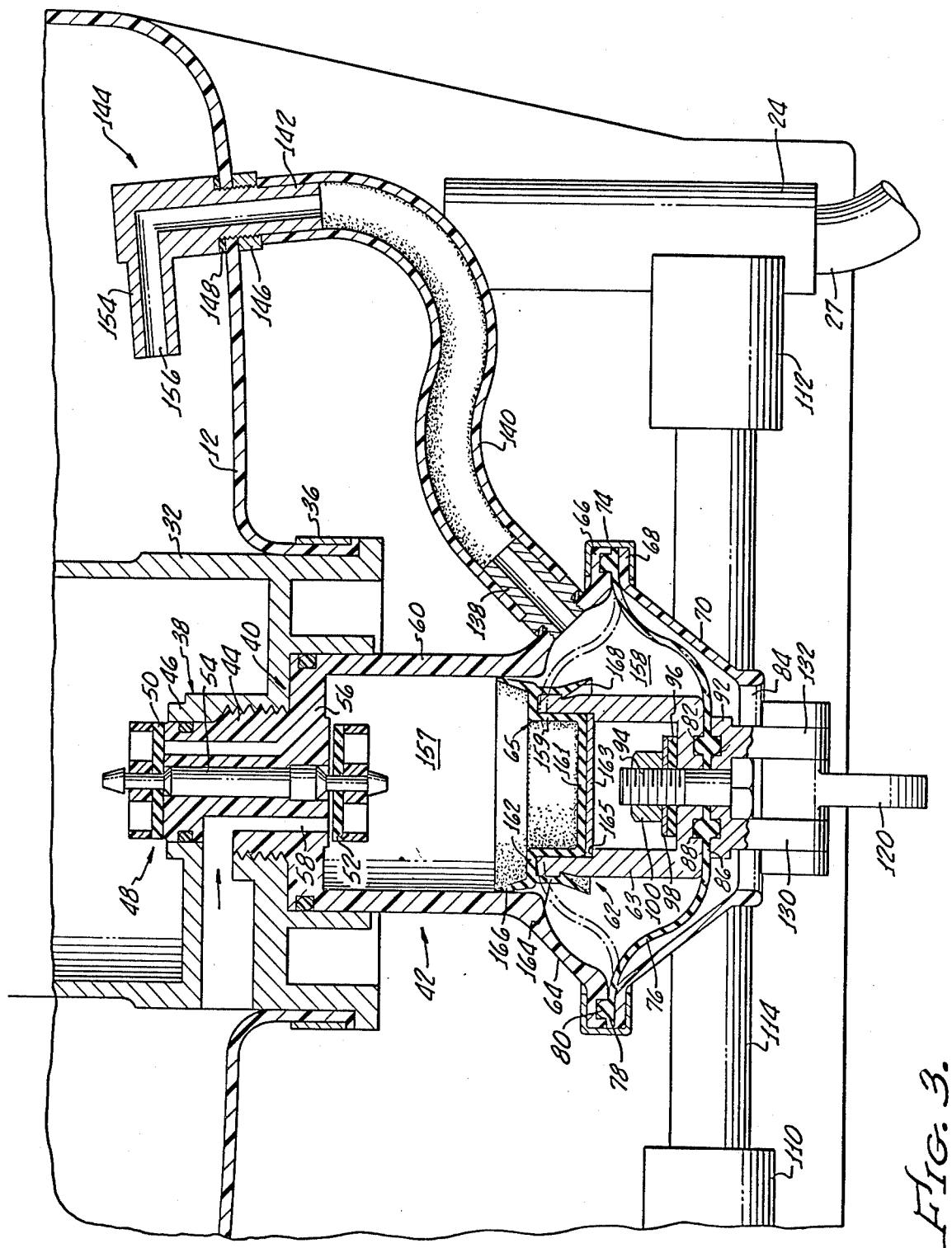
FIG. 3 is an enlarged, fragmentary sectional view of the piston and diaphragm pumps of the sprayer of FIGS. 1 and 2, showing the agitating conduit connection between the diaphragm pump chamber and the container, drawn to a larger scale.

The secondary or diaphragm pump is formed in part by a deep bell-shaped diaphragm 76 having a peripheral circular edge 78, having a circumferential rib 80, that is clamped at its edge between the flanges 66 (having a groove receiving rib 80) and 68 of the housing section 64 and cover section 70, respectively, to thereby compress rib 80 to firmly secure and effectively seal the diaphragm around its periphery without use of any bolts or screws and the leaking apertures needed for such bolts or screws. The diaphragm is made of a stiff, resilient material which, in unstressed condition, has the configuration illustrated in FIG. 3. The diaphragm moves during pumping action to the dotted line position illustrated in FIG. 3, during which motion the diaphragm undergoes a reverse bending to the illustrated reverse bell-shaped configuration shown in dotted lines. The stiffness and resilience of the diaphragm are such that the diaphragm, when in its dotted line position, is strongly urged by the stress of its flexed condition to return to its unstressed configuration, shown in FIG. 3 in solid lines. In effect, the diaphragm acts as a strong spring which allows the diaphragm to be flexed during the pumping action as will be described below, but which provides a strong, resilient returning force that urges the diaphragm and the attached piston (as will be presently described) back to the position illustrated in solid lines in FIG. 3.

The diaphragm is formed with first and second circular sealing ribs 82,84 projecting from opposite sides of a substantially flat central section 86 thereof. Rib 82 is received in a circular groove 88 formed in a lower surface of a flat bottom portion 90 of the hollow, cylindrical piston 62. Sealing rib 84 is received in a similar circular groove formed in a sealing and securing washer 92 on the other side of the diaphragm. A headed bolt 94 extends through the center of the diaphragm, through the sealing ribs, through a pair of washers 96,98 and is threadedly received in a nut 100. Preferably the parts such as the washers 96,98, nut 100 and the piston 62 are formed of an inert, corrosion-resistant plastic (one or both of the washers may be stainless steel) in order to resist corrosive effects of the liquids that are used in the apparatus. The bolt 94 with its nut 100 thus strongly presses the lower flat portion of the piston against the flat central portion of the diaphragm to effect a tight sealing of and strong connection between the elements, with nut 100 pressing against the sealing washer 98 and piston bottom portion pressing against and sealed to the central section of the diaphragm 86 so as to insure a maximum sealing of the interior of the housing.

Integral container back panel 18 is formed with handle bosses 110,112 which receive a horizontal section 114 of a pump operating handle 116 having an operator grasping section 118 that extends generally rearwardly and/or upwardly from the lower end of the container. The handle is pivotally mounted in the bosses 110 and 112 (for rotation about the axis of section 114) and has fixedly attached thereto a curved, rigid connecting link 120 which is pivoted to a pin 122 that extends through an end of the link 120 and through a pair of arms 130,132 forming a yoke that pivotally interconnects the operating handle with the diaphragm and piston.

Outwardly flared housing section 64 is formed with an upwardly and outwardly projecting connecting fitting 138 to which is securely attached a flexible agitator conduit 140 having its other end connected to one leg 142 of an L-shaped fitting 144 of which 142 is threaded and connected to the container by a nut 146. Container fitting 144 extends through an aperture formed in the bottom of the container 12 and is sealed thereto by means of a washer 148 in contact with the inner surface of the container. The inner end of fitting 144 is formed as a jet nozzle 154 that has an input/output port 156 oriented to direct liquid projected from the nozzle 154 in a selected direction such as for example, horizontally, so that projected liquid will tend to flow in a continuous or swirling path around the container bottom. Position and orientation of the jet nozzle are selected to provide an input flow of the projected high velocity stream that will give maximized agitation. For example, the jet nozzle is arranged to project a liquid stream, near the container's bottom, in a substantially horizontal plane, tangentially of, or along the walls of the container so as to tend to cause liquid in or near the container bottom to flow in a near horizontal path that extends around the interior of the container.

The volume above the piston within the cylinder housing section 60 may be termed a piston pressure chamber 157. The volume defined between the outer surface of the piston, the upper surface of diaphragm 76 and the outwardly flared housing section 64 forms a diaphragm or agitator chamber 158 which is pressurized by the upward motion of diaphragm and piston during the upward or pressure stroke.

The cylindrical, hollow piston holder 63 has its upper or forward end sealed to the interior surface of pump housing section 60 by means of the piston cup 65 which has an integral annular peripheral sealing skirt 160 which, together with the cup is snapped onto and over the open or upper end of the piston holder 63. The piston cup includes an upwardly opening inner section having a circular cylindrical wall 159 extending downwardly along the inner surface of the circular cylindrical wall of piston holder 63 and closed at its lower end by a flat circular end member 161. The piston cup end member rests against and is supported (when under pressure) by a strong, rigid metal disc 163 that is seated on an upwardly facing shoulder 165 of the piston holder 63. The skirt (see FIG. 5) includes a body section that is substantially inverted L-shaped in cross-section, having an upper horizontal leg 162, and a lower vertical leg 164. Leg 162 overlies the upper end of the piston, being connected to wall 159, and leg 164 overlies the outer side of the upper end of the piston holder. A forwardly (upwardly) and outwardly projecting peripheral skirt lip 166, integrally formed with the L-shaped skirt body 162,164, seals the piston to the inner surface of cylinder housing section 60 during the upward or pressure stroke of the piston. A similar outwardly flaring but rearwardly (downwardly) projecting peripheral skirt lip 168, formed integrally with the lower end of skirt leg 164, seals the piston 62 to the cylinder section 60 to seal the diaphragm or agitator chamber 158. The vertical leg 164 of the skirt is formed with an inwardly projecting peripheral flange 170 that overlies the bottom of an angulated peripheral notch 172 formed in the outer surface of the wall of piston holder 63. Flange 170 is resiliently received in the notch 172. The location of notch 172 relative to the free end of the piston and the space between the lower surface of skirt leg 162 and upper surface of flange 170 are chosen to provide a close, resilient fit of the skirt and piston cup upon the end of the piston holder whereby the skirt and cup may be resiliently snapped onto the end of the piston holder and the entire piston cup will be retained in place by the resilient clamping action afforded between the horizontal leg 162 and flange 170 of the piston sealing skirt 160.

Figure 5:
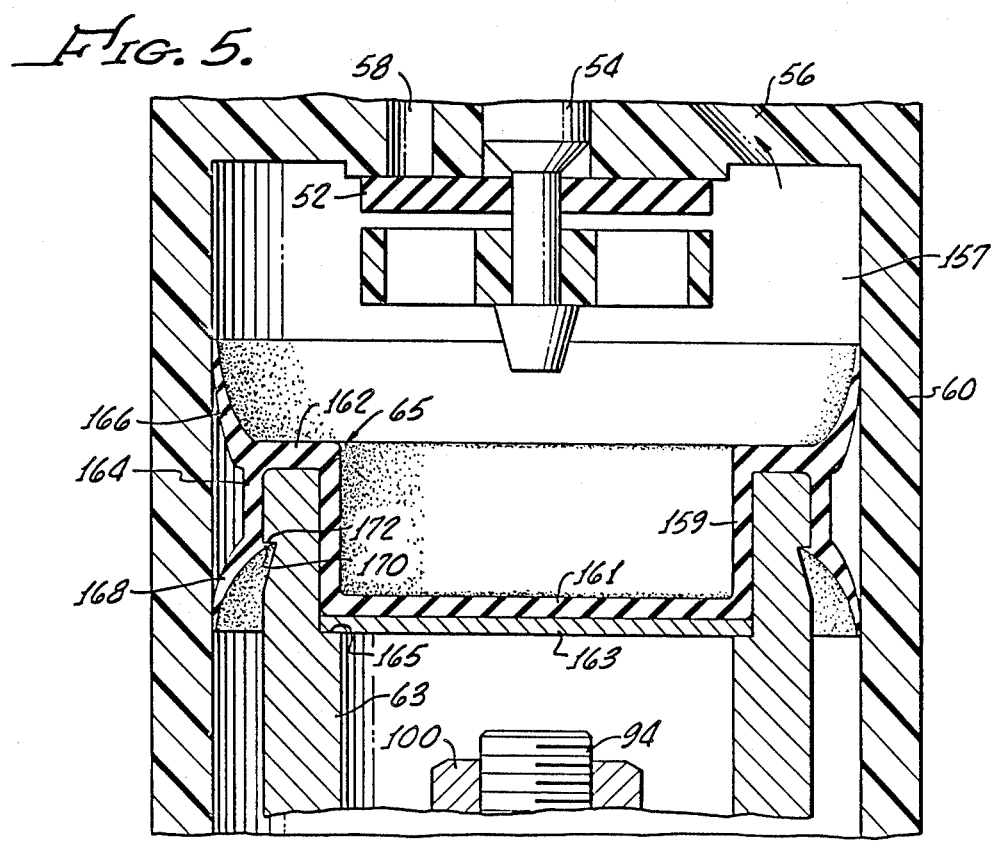
FIG. 5 is a fragmentary, detailed illustration of the piston sealing skirt.

During the upward or pressure stroke, piston chamber 157 is pressurized so that the increased pressure within this chamber is exerted upon the interior surface of the forward piston skirt lip 166 causing the latter to bow outwardly, as illustrated in FIG. 5. This outward bowing under pressure significantly enhances the sealing afforded by the sealing skirt at least in part because the skirt lip in bowed configuration has an increased area of its surface in contact with the surface of the cylinder wall. Similarly, on the suction stroke, the pressure in piston chamber 157 is decreased to thereby enable the skirt lip 166 to resume its substantially unstressed condition, illustrated in solid lines in FIG. 3. Thus, on the suction stroke there is less force exerted by the skirt on the cylinder wall and, accordingly there is less total wear on the sealing skirt.

In a similar manner, the lower skirt lip 168 seals the diaphragm or agitator chamber 158 against leakage of liquid contained in this chamber past the piston into the chamber 157. As the entire sealing skirt enters the piston cylinder housing section, chamber 158 is pressurized and this pressure causes the lower skirt lip 168 to be bowed outwardly as shown in FIG. 5, thereby placing a greater area of the outer surface of this lip in contact with the inner surface of the cylinder wall and thus increasing the effectivity of the seal. The greater the pressure the greater the force with which the sealing skirt 168 (like the sealing skirt 166) is forced against the cylinder wall, thereby enhancing the sealing as pressure increases. The enhanced sealing during the diaphragm pressure stroke ensures improved agitation because all of the liquid pumped by the diaphragm during its pressure stroke flows into the container and not past the piston into the piston chamber. Similarly, on the downward or suction stroke, as the diaphragm moves downwardly and pressure within diaphragm chamber 158 decreases, the lip 168 returns to its unstressed configuration as shown in solid lines in FIG. 3 thereby pressing with decreased force against the wall and causing decreased wear on the skirt. The skirt 160 and cup 65 are preferably made of a low friction, corrosive resistant material such as mylar or teflon. The cup 65 seals the inside of the piston holder, thereby protecting the nut and bolt 94,100 and disc 163 from corrosive effects of liquid being sprayed.

The pump assembly and the sprayer described above are uniquely configured to provide a number of different functions. The pump assembly acts as a high pressure, high volume piston pump that efficiently and effectively pumps high pressure liquid into the interior of the pressure vessel. The assembly includes a secondary pump in the form of a diaphragm which itself performs two additional functions. First the diaphragm is arranged to collect and confine any liquid that may leak past the piston of the high pressure piston pump. Second, the diaphragm acts as a secondary pump, having both input and output connected to the interior of the container and which agitates liquid in the outer container. The diaphragm, together with the pump housing and the piston, defines a diaphragm or agitator chamber into which liquid that leaks past the piston will flow. Accordingly, piston leakage is confined within the apparatus and does not leak onto the operator, his clothing or equipment. By connecting the diaphragm chamber to the container, the pumping action of the diaphragm, as it reciprocates upwardly and downwardly together with the piston of the piston pump, causes liquid to flow back and forth between the piston chamber and the container. The liquid flows in a high velocity stream into the container repetitively on each pressure stroke of the dual pump arrangement and thus provides a pulsating jet that is directed into the contents of the container to provide effective agitation. A third function of the diaphragm is provided by its inherent resilience which causes the stiff resilient diaphragm of the secondary pump to act as a return spring for both primary and secondary pumps. The unique combination of primary and secondary pumps configured for high pressure spraying and effective agitation uniquely allows a more thorough cleaning of the apparatus by permitting relatively easy discharge of all portions of the interior.

In operation of the described apparatus, the operator upon whose back the sprayer is mounted, as by suitable straps or other connecting devices (not shown), reciprocally pivots handle 116 about the pivot 122 to thereby cause reciprocation of the piston of the primary pump and the diaphragm of the secondary pump. During this reciprocation, the piston and diaphragm move from the extreme downward or suction piston illustrated in solid lines in FIG. 3 to an upper or pressure position shown in dotted lines in this figure. In the downward position, the piston itself is completely withdrawn from the cylinder 60 although the upper skirt lip 166 of the sealing skirt is still in operative sealing contact with the inner surface of the piston wall, and will ensure reentry of the piston on the next pressure stroke. The forward projection of the skirt, above and beyond the top of the piston, enables a longer pumping stroke and and an increased volume per stroke. The use of the flared skirt lip 116 creates an increased volume in the piston chamber.

In the extreme upper position of the piston and diaphragm, the diaphragm is reversely bowed and resiliently stressed. As previously mentioned, the diaphragm in this position acts like a compressed return spring and strongly urges both the piston and the diaphragm to return to the extreme lower position, thus significantly assisting the operator in his reciprocating drive of the handle. The arrangement of forces and configurations is such that the operator need exert little or no force to move the piston and diaphragm from its uppermost pressure position to its lowermost position. At most the operator need only start the motion of the piston and diaphragm from the uppermost position toward its lowermost position. As the piston and diaphragm approach, but before they have reached, a dead center position, the resiliance of the diaphragm takes over and rapidly snaps the piston and diaphragm back to the lowermost position Upon the suction (downward) stroke, the valve assembly moves dowwardly, decreasing pressure in piston chamber 157, and liquid from the container flows through passage 58 into the piston chamber. On the suction stroke, the diaphragm chamber 158 also experiences a decrease in pressure and draws liquid into the diaphragm chamber 158 from the interior of the container via the agitating conduit 140.

On the pressure stroke, the piston and diaphragm move upwardly, decreasing volume in both the piston chamber 157 and the diaphragm chamber 158. Liquid under pressure is forced from the piston chamber 157 through the discharge passage 56 into the interior of the pressure vessel 32.

Figure 4:
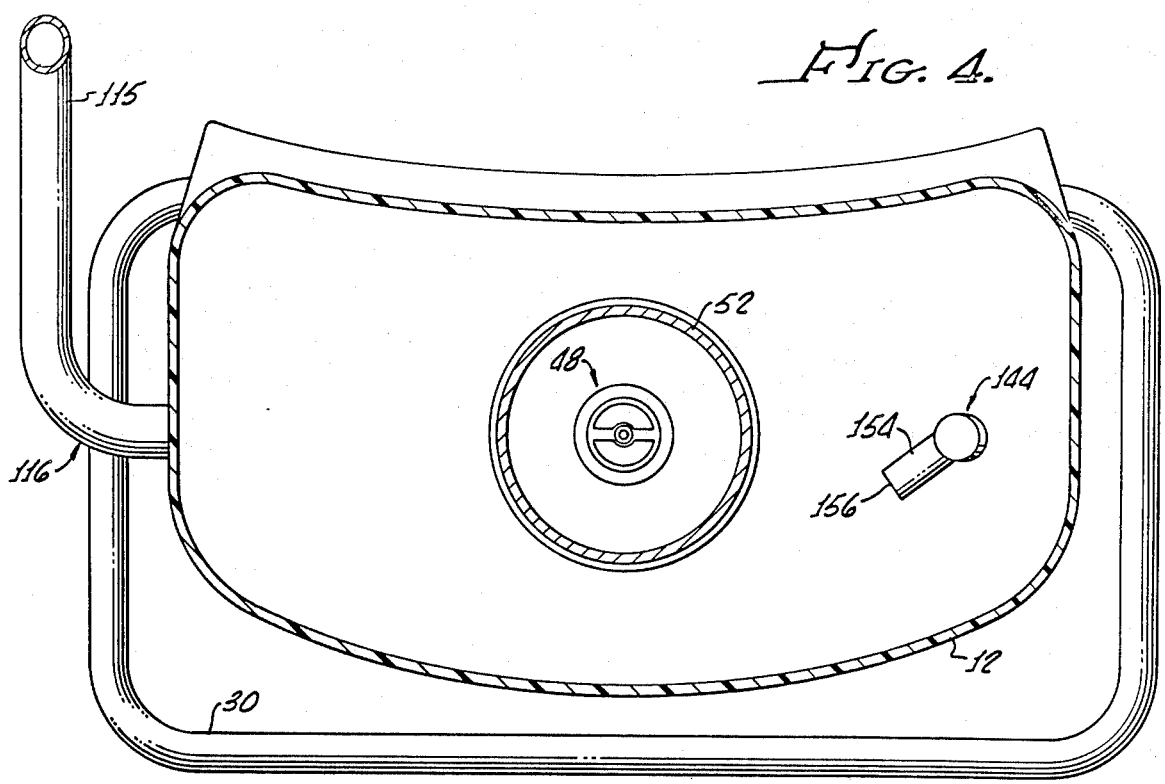
FIG. 4 is a section taken on line 44 of FIG. 2 showing the location of the agitating jet nozzle within the interior of the container.

On the pressure stroke, the diaphragm of the secondary pump pumps liquid from the diaphragm chamber 158 through the agitating conduit 140 into the interior of the container 12. This liquid is forced through the conduit and through the jet nozzle 154 from which it is projected in a high velocity stream that is directed by the nozzle so as to maximize the agitating action of the this high velocity stream as it enters the body of liquid confined in the container. The nozzle input/output port 156 is positioned near the bottom of the container, which is where the precipitated sediment collects, but is remote from the piston pump input conduit 58, as can be seen in FIG. 4. Accordingly, the repetitive or pulsating high velocity jet that is projected from the nozzle upon the occurrence of repetitive pumping strokes creates turbulent, continuous swirling flow of the liquid near the lowermost portion of the container, which causes agitation of liquid throughout the volume of the container. This agitation of the entire body of liquid brings precipitated sediment back into suspension and helps to maintain preselected rates of application of the sprayed materials.

If agitation is not needed or desired, nozzle 154 may be replaced by a long, vertically-oriented tube having its input/output port positioned at an upper portion of the container that is above the level of liquid confined in the container. Accordingly, with such configuration, air, but not liquid, is drawn from the container into the diaphragm chamber 158. But even in this configuration, which is without agitation, liquid leaking past the piston is contained within the diaphragm chamber 158 and may be periodically expelled therefrom into the interior of the container. Further, the diaphragm still acts as a return spring for the piston.

Pressurized liquid is discharged from the pressure vessel via a fitting 164 connected to the pressure vessel and to a discharge tube 166, to be sprayed from spray nozzle 168 under control of a manually operated valve 170.

The described apparatus provides a sprayer having an effective and efficient piston pump that is capable of providing a much higher pressure than is available from a diaphragm pump. In addition, the apparatus provides a diaphragm pump that can provide effective agitation by projecting a pulsating or repetitive high velocity liquid stream into the interior of the container to thereby effectively mix any sediment that may have precipitated from the solution. The stiff resilient diaphragm also acts as a return spring for both primary and secondary pumps.

Another significant advantage of the described apparatus is its ability to seal and confine piston leakage. As the piston seal, whether in the improved form illustrated herein or in a conventional ring-type seal, is operated over many cycles, it is subject to deterioration and wear so that the high-pressure operation eventually will cause leakage of liquid past the piston into the diaphragm chamber 158. In the absence of diaphragm 76, liquid that leaks past the piston will also leak out of the pump housing itself and fall upon the operator or his clothing or nearby equipment and premises. Since the liquids sprayed in common agricultural sprayers of the type described herein are not only corrosive but also are toxic to humans, such leakage presents serious problems. However, with the described diaphragm agitator pump combined with the piston pump, there is built-in leakage containment. Liquid leaking past the piston seal into the diaphragm chamber 158 not only is confined within the body of the chamber, and thus prevented from leaking out of the pump to contaminate or poison the operator or his clothing, but is actually returned to the interior of the pumping system by the agitator action.

Still another significant advantage of the described apparatus is the ability to flush and fully clean the entire interior of the mechanism. If the corrosive, toxic liquids that are commonly employed in such sprayers are allowed to remain within portions of the equipment, they tend to crystallize and may be difficult to remove, whereby when different chemicals are employed at different times with the same sprayer, residue of an earlier used chemical may be mixed with a subsequently used chemical, with undesirable effects. Retention of the chemicals within the apparatus also decreases equipment life. With the described apparatus, it is only necessary to remove the cover 16 and turn the apparatus upside down to completely cleanse and flush all of the interior chambers. For cleaning and flushing the described apparatus, it is filled with clear, fresh water and a number of pumping strokes undertaken to contact and dissolve all residue and crystallized portions of insecticides that have been previously used. After a number of pumping strokes to insure that all remaining insecticide is back in suspension, the apparatus is turned upside down and additional pumping strokes will insure that all interior portions are evacuated. The container contents are emptied directly through the top of the container (which is now at the bottom). The piston pumping chamber 157 is emptied via the pumping action into the pressure chamber and from there through the discharge nozzle. The agitating chamber 158 is emptied via the agitating conduit 140 into the container from which it is emptied via the container opening. This pumping and flushing procedure accomplished with the apparatus in an upside down condition is repeated several times by refilling the container with fresh water and repeating the several pumping and flushing steps described above to insure complete flushing of the interior of the system.

It will be readily appreciated that a secured conduit may be connected between the diaphragm chamber 158 and the interior of the container at a point remote from the end of nozzle 154. In such configuration both conduit 140 and the second conduit are provided with check valves whereby on the suction stroke liquid is drawn from the container into the diaphragm chamber through one conduit, and on the pressure stroke liquid is forced from the diaphragm chamber back into the container through the other conduit. This arrangement provides both agitation and circulation of container contents.

There has been described an improved portable sprayer having a high pressure piston pump of which leaks are confined by a diaphragm pump that is connected to operate together with the piston. The diaphragm pump not only contains and confines piston leakage, but actually repetitively flows liquid back and forth between the diaphragm pump chamber and the container interior to provide a pulsating high velocity liquid stream that is projected into the container interior for effective agitation of the contents thereof. The entire arrangement is readily cleaned and flushed by filling the container with fresh water, turning the container upside down and operating the pump to wash out the interior spaces so that the entire interior may be completely flushed.

The foregoing detailed description is to be clearly understood as given by way of illustration and example only, the spirit and scope of this invention being limited solely by the appended claims.

What is claimed is:

1. A liquid dispensing sprayer and liquid agitator comprising
   a container for confining a body of liquid to be sprayed,
   a pressure vessel mounted in the container,
   a pump connected to the pressure vessel and having input and output ports in communication with said container and said pressure vessel respectively,
   valve means for permitting flow of liquid into the pump from the container and into the pressure vessel from the pump,
   said pump including a pump housing having a piston receiving section and an agitator chamber section,
   a cover secured and sealed to said agitator chamber section,
   a diaphragm having a peripheral edge secured and sealed to and between said cover and said agitator chamber section and sealing one end of said piston receiving section,
   a piston slideably mounted in sealing relation to and within said piston receiving section for motion between a pressure position and a suction position, said diaphragm, said piston and said agitator chamber section cooperating to define an agitator pump chamber,
   means for concomitantly driving said piston and diaphragm in reciprocating pressure and suction strokes,
   and
   an agitator conduit connecting the interior of said agitator pump chamber with the interior of said container, whereby liquid is alternately drawn from the container into the agitator pump chamber and forced in a high velocity stream into said container from the agitator pump chamber.

2. The liquid dispensing sprayer and liquid agitator of claim 1 wherein said agitator conduit has a nozzle connected to one end thereof and terminating within said container at a point below the surface of liquid contained therein.

3. The liquid dispensing sprayer and liquid agitator of claim 1 wherein said agitator conduit has a nozzle connected to one end thereof and terminating within said container at a point below the surface of liquid contained therein, said nozzle being located and oriented to cause the contents of said container to flow in an agitating path around the interior of the container.

4. The liquid dispensing sprayer and liquid agitator of claim 1 wherein said piston includes a skirt on one end thereof, said skirt having a first sealing section extending around the interior surface of said cylindrical piston receiving section and flaring outwardly and forwardly from an end of said piston to seal the piston during a forward stroke of the piston, said piston skirt having a second rearward section extending around the periphery of the piston and flaring outwardly and rearwardly toward said agitator pump chamber to seal said agitator pump chamber during a forward stroke of diaphragm, to thereby restrain liquid from flowing past said piston into said cylindrical piston receiving section during the forward stroke of said diaphragm.

5. The liquid dispensing sprayer of claim 1 wherein said piston includes a cylindrical piston holder having a circular wall and a cylindrical piston cup mounted in said piston holder and having a circular wall adjacent said piston holder wall, a cup support disc mounted in said holder, said cup having an end portion extending across and closing one end of said circular wall of the cup and resting upon said cup support disc, said cup being resiliently secured to said piston holder and having a peripheral sealing skirt.

6. The liquid dispensing sprayer of claim 5 wherein said skirt includes first and second sealing sections extending around an end of said piston holder and flaring outwardly and respectively forwardly and rearwardly relative to said piston holder.

7. The liquid dispensing sprayer and liquid agitator of claim 1 wherein said diaphragm is formed with a substantially flat central section having a first endless rib projecting from an inner surface of the diaphragm and a second endless rib projecting from an opposite surface of the diaphragm, means connected with a central portion of said piston for receiving said first endless rib and sealing means on the other side of the diaphragm for receiving said second endless rib, and means for compressing the central section of said diaphragm and said first and second ribs between said piston and said sealing means.

8. The liquid dispensing sprayer and liquid agitator of claim 1 wherein said container has a selectively sealed fill opening, wherein the pump housing, piston and diaphragm are connected to the container and pressure vessel at a lowermost side thereof, wherein liquid leaking past said piston flows into said agitator pump chamber and is confined therein and caused to flow into said container, and wherein said sprayer may be cleaned and flushed and emptied of liquid in the pressure vessel, in the container, in the pump housing cylindrical piston receiving section, and in the agitator pump chamber by turning the sprayer upside down and reciprocating the piston and diaphragm after filling the container with a cleansing solution, to thereby flow the cleansing solution through the sprayer and to allow all liquid to flow from the sprayer through the fill opening of the container and through the pressure vessel discharge tube.

9. A backpack sprayer for spraying insecticides, herbicides and the like, including suspensions of wettable powders, comprising:
- a container adapted to be carried on the back of a person,
- a pressure vessel mounted within said container,
- combined pressure and agitator pump means connected to the container and pressure vessel for pumping liquid from said container into said pressure vessel, said pump means comprising:
  - a cylinder,
  - an outwardly flared housing section connected to one end of said cylinder,
  - a cover of generally frustoconical configuration connected and sealed to said housing section and cooperating therewith to partly define an agitator pump chamber,
  - a piston slideably mounted in said cylinder for motion between a pressure position in which a major portion of the piston is within said cylinder and a second position in which a portion of the piston is withdrawn from said cylinder and positioned within said agitator pump chamber,
  - said cylinder and piston defining a piston pump chamber having input and output ports,
  - an agitator pump diaphragm extending across said agitator pump chamber and sealed thereto, said diaphragm cooperating with said outwardly flared housing section to define said agitator pump chamber, said diaphragm forming a seal for said pump chamber,
- valve means for connecting said output port to the interior of said pressure vessel and said input port to the interior of said container,
- a discharge tube connected with the pressure vessel for spraying liquid under pressure,
- a conduit having a nozzle end in fluid communication with the interior of said container and having a pump end in fluid communication with said agitator pump chamber, and
  - means for concomitantly driving said piston and diaphragm, whereby liquid under pressure is pumped from the container into the pressure vessel by the piston, and the agitator pump diaphragm draws liquid from the container into the agitator pump chamber and projects liquid from the agitator pump chamber back into the container in a high velocity stream.

10. A backpack sprayer for spraying insecticides, herbicides and the like, including suspensions of wettable powders, comprising:
- a container,
- a pressure vessel mounted within said container,
- means for discharging liquid from the pressure vessel,
- a pump housing having first and second pumping chambers,
- first pumping means in said first pumping chamber operable in a suction stroke for drawing liquid from the container into said first pumping chamber and operable in a pressure stroke for forcing liquid from the first chamber into the pressure vessel,
- valve means at one end of said housing for permitting flow of liquid from the container into the first pumping chamber and from the first pumping chamber into the pressure vessel,
- diaphragm means connected across said pump housing and sealing one end of said first pumping chamber, said diaphragm means cooperating with said pump housing and said first pumping means to define said second pumping chamber between said first pumping means and said diaphragm,
- drive means connected to both said first pumping means and said diaphragm means for driving said first pumping means in said suction and pressure strokes and for driving said diaphragm means in suction and pressure strokes, and
- conduit means connected between said second pumping chamber and said container for drawing liquid from the container into the second pumping chamber during the suction stroke of the first pumping means and diaphragm means, and for forcing liquid from the second pumping chamber during the pressure stroke of the first pumping means and diaphragm means.

11. A backpack sprayer for spraying insecticides, herbicides and the like, including suspensions of wettable powders, comprising:
- a container,
- a pressure vessel mounted within said container,
- means for discharging liquid from the pressure vessel,
- a pump housing having first and second pumping chambers,
- first pumping means in said first pumping chamber operable in a suction stroke for drawing liquid from the container into said first pumping chamber and operable in a pressure stroke for forcing liquid from the first chamber into the pressure vessel,
- valve means at one end of said housing for permitting flow of liquid from the container into the first pumping chamber and from the first pumping chamber into the pressure vessel,
- diaphragm means connected across said pump housing and sealing one end of said first pumping chamber, said diaphragm means cooperating with said pump housing and said first pumping means to define said second pumping chamber between said first pumping means and said diaphragm,
- drive means connected to both said first pumping means and said diaphragm means for driving said first pumping means in said suction and pressure strokes and for driving said diaphragm means in suction and pressure strokes, and
- conduit means connected between said second pumping chamber and said container for drawing liquid from the container into the second pumping chamber during the suction stroke of the first pumping means and diaphragm means, and for forcing liquid from the second pumping chamber during the pressure stroke of the first pumping means and diaphragm means,
  - said conduit means comprising a single conduit connected to flow liquid back and forth between said second pumping chamber and said container.

12. The sprayer of claim 10 wherein said first pumping means comprises a piston having one end secured to said diaphragm and to said drive means.

13. A liquid dispensing sprayer and liquid agitator comprising
- a container for confining a body of liquid to be sprayed,
- a pressure vessel mounted in the container,
- a pump connected to the pressure vessel and having input and output ports in communication with said container and said pressure vessel respectively,
- valve means for permitting flow of liquid into the pump from the container and into the pressure vessel from the pump,
- said pump including a pump housing having a cylindrical piston receiving section and an agitator chamber section,
- a cover secured and sealed to said agitator chamber section,
- a diaphragm having a peripheral edge secured and sealed to and between said cover and said agitator chamber section and sealing one end of said piston receiving section,
- a piston slideably mounted in sealing relation to and within said cylindrical piston receiving section for motion between a pressure position and a suction position, said diaphragm, said piston and agitator chamber section cooperating to define an agitator pump chamber,
- said piston including a cylindrical piston holder having a circular wall and a cylindrical piston cup mounted in said piston holder and having a circular wall adjacent said piston holder wall, a cup support disc mounted in said holder, said cup having an end portion extending across and closing one end of said circular wall of the cup and resting upon said cup support disc, said cup being resiliently secured to said piston holder and having a peripheral sealing skirt,
- said piston holder having an end wall spaced from said cup support disc, and fastener means extending through said diaphragm and piston holder end wall for securing the diaphragm to the piston, said fastener means terminating within said piston holder between the piston holder end wall and said cup support disc, whereby said fastening means is sealed from liquid in said cylindrical piston receiving section,
- means for concomitantly driving said piston and diaphragm in reciprocating pressure and suction strokes,
and
- an agitator conduit connecting the interior of said agitator pump chamber with the interior of said container, whereby liquid is alternately drawn from the container into the agitator pump chamber and forced in a high velocity stream into said container from the agitator pump chamber.

14. A liquid dispensing sprayer and liquid agitator comprising
- a container for confining a body of liquid to be sprayed,
- a pressure vessel mounted in the container,
- a pump connected to the pressure vessel and having input and output ports in communication with said container and said pressure vessel respectively,
- valve means for permitting flow of liquid into the pump from the container and into the pressure vessel from the pump,
- said pump including a pump housing having a piston receiving section and an agitator chamber section,
- a cover secured and sealed to said agitator chamber section,
- a diaphragm having a peripheral edge secured and sealed to and between said cover and said agitator chamber section and sealing one end of said piston receiving section,
- a piston slideably mounted in sealing relation to and within said piston receiving section for motion between a pressure position and a suction position, said diaphragm, said piston and said agitator chamber section cooperating to define an agitator pump chamber,
- means for concomitantly driving said piston and diaphragm in reciprocating pressure and suction strokes,
and
- a single conduit connected to flow liquid back and forth between said agitator pump chamber and said container.

15. A backpack sprayer for spraying insecticides, herbicides and the like, including suspensions of wettable powders, comprising:
- a container adapted to be carried on the back of a person,
- a pressure vessel mounted within said container, and
- combined pressure and agitator pump means connected to the container and pressure vessel for pumping liquid from said container into said pressure vessel, said pump means comprising:
  - a pump housing having adjacent interconnected piston and diaphragm sections, said piston section opening into said diaphragm section,
  - a piston in said piston section cooperating with said housing to define a piston pump chamber in said piston section at one side of said piston,
  - a diaphragm extending across and sealing said diaphragm section, said diaphragm and piston cooperating with said pump housing to define an agitator pump chamber in said diaphragm section on the other side of said piston between the piston and the diaphragm,
  - means for connecting one end of the piston to a center portion of the diaphragm,
  - drive means connected to the diaphragm and to said one end of the piston to reciprocate the piston and diaphragm together in their respective chambers,
  - valve means in said piston section for providing communication between said piston pump chamber and each of said container and pressure vessel,
  - conduit means for providing flow of liquid between said container and said agitator pump chamber, and
- means for discharging liquid from said pressure vessel.

16. A backpack sprayer for spraying insecticides, herbicides and the like, including suspensions of wettable powders, comprising:
- a container adapted to be carried on the back of a person,
- a pressure vessel mounted within said container, and combined pressure and agitator pump means connected to the container and pressure vessel for pumping liquid from said container into said pressure vessel, said pump means comprising:
- a pump housing having adjacent interconnected piston and diaphgram sections, said piston section opening into said diaphragm section,
    - a piston in said piston section cooperating with said housing to define a piston pump chamber in said piston section at one side of said piston,
- a diaphragm extending across and sealing said diaphragm section, said diaphragm and piston cooperating with said pump housing to define an agitator pump chamber in said diaphragm section on the other side of said piston between the piston and the diaphragm,
- means for connecting one end of the piston to a center portion of the diaphragm,
- drive means connected to the diaphragm and to said one end of the piston to reciprocate the piston and diaphragm together in their respective chambers,
- valve means in said piston section for providing communication between said piston pump chamber and each of said container and pressure vessel, and
- a single conduit connected to flow liquid back and forth between said agitator pump chamber and said container.

* * * * *